United States Patent [19]

Higgerson

[11] 4,099,604

[45] Jul. 11, 1978

[54] FRICTION CLUTCH WITH INTEGRAL ADJUSTER

[75] Inventor: Raymond Higgerson, Leamington Spa, England

[73] Assignee: Automotive Products Limited, Leamington Spa, England

[21] Appl. No.: 780,120

[22] Filed: Mar. 22, 1977

[30] Foreign Application Priority Data

Mar. 24, 1976 [GB] United Kingdom ............... 11764/76

[51] Int. Cl.² ............................................. F16D 13/75
[52] U.S. Cl. ............................................. 192/111 A
[58] Field of Search ............... 192/111 A, 70.25, 13 R

[56] References Cited

U.S. PATENT DOCUMENTS

| | | | |
|---|---|---|---|
| 2,207,051 | 7/1940 | Colman | 192/111 A |
| 2,241,223 | 5/1941 | Spase et al. | 192/111 A |
| 2,280,355 | 4/1942 | Spase et al. | 192/111 A |
| 3,938,636 | 2/1976 | Nerska | 192/111 A |

*Primary Examiner*—Edgar W. Geoghegan
*Attorney, Agent, or Firm*—Kemon & Estabrook

[57] ABSTRACT

A friction clutch is of the type comprising a clutch cover for attachment to a flywheel, a pressure plate, a main spring assembly arranged to act between the cover and the pressure plate to provide a clamp load to urge the pressure plate towards the flywheel and thereby grip a driven plate between the friction surfaces of the pressure plate and flywheel, and a release mechanism for relieving the clamp load. The pressure plate is formed in two relatively adjustable components which can compensate for variations due to wear in the thickness of the driven plate and thereby maintain a constant clamping condition of the main spring. An adjuster mechanism incorporates relatively adjustable interengaging members of the two pressure plate components which maintain a constant inter-engaged state during release and re-engagement of the clutch while the clutch remains in the desired state of adjustement. A control member responsive to movement between the released and engaged conditions of the clutch is operative to effect an incremental adjustment of the interengaging members when said movement exceeds a predetermined distance.

8 Claims, 3 Drawing Figures

FRICTION CLUTCH WITH INTEGRAL ADJUSTER

BACKGROUND OF THE INVENTION

A typical friction clutch operates in conjunction with the flywheel of an internal combustion engine and incorporates a cover, a pressure plate, and a driven plate. A spring assembly which may be a series of coil springs or a diaphragm spring acts between the cover and the pressure plate to grip frictionally the driven plate between friction faces of the flywheel and the pressure plate. A release mechanism is provided for releasing the friction grip between the pressure plate and the flywheel. With a typical diaphragm spring clutch the levers of the diaphragm spring, commonly referred to as fingers, act as part of the release mechanism by relieving the force of the diaphragm spring on the pressure plate. In the case of a coil spring clutch, the release mechanism is normally constituted by release levers which positively withdraw the pressure plate against the force of the coil springs.

In use the thickness of the driven plate decreases as a result of normal frictional wear with the result that the spring assembly has to move the pressure plate nearer to the flywheel and thus operates at a different point on its spring characteristic. Particularly in the case of a coil spring clutch this affects the engagement pressure between the pressure plate and the flywheel which in turn affects the torque capacity of the clutch. In the case of a diaphragm spring clutch, where a typical diaphragm spring has a non-linear characteristic, the clamp load between the pressure plate and the flywheel can remain almost constant over a considerable range of wear as the clutch wears but the clamp load can fall off rapidly with wear during the latter part of the life of the clutch. The load necessary to hold a disphragm spring clutch in its released position through the release mechanism can also increase with wear of the clutch.

These problems can be particularly significant in the case of twin plate clutches (i.e. clutches with two driven plates and an additional intermediate pressure plate between the two driven plates) because the extent of wear involved in two driven plates is greater than the corresponding wear in a single driven plate.

An automatic adjuster is often provided in a clutch operating mechanism. Such as adjuster does not affect the point of engagement of the clutch with respect to the clutch spring characteristic but merely adjusts the operating mechanism so that the usual clutch pedal engages or disengages the clutch at approximately the same position in its travel.

Also U.S. Pat. No. 3,938,636 describes a friction clutch which incorporates an automatic adjuster within the clutch pressure plate but this automatic adjuster is such that the two components of the pressure plate are disengaged from each other and re-engaged again with a wedging action on every clutch release operation and every clutch re-engagement operation. Such a mechanism is subject to wear in use so that it may have a short life and if it falls to operate, the whole clutch immediately becomes inoperative. Also the establishment of a wedging inter-engagement as required by every clutch operation and maintenance of a wedging engagement while the clutch remains engaged could become unreliable as it has to take place in what might be a vibratory environment with wide variations in temperature.

The present invention aims to overcome or substantially reduce the above disadvantages.

SUMMARY OF THE INVENTION

The present invention provides a friction clutch comprising: a clutch cover for attachment to a flywheel, a pressure plate, a main spring assembly arranged to act between the cover and the pressure plate to provide a clamp load to urge the pressure plate towards the flywheel and thereby grip a driven plate between the friction surfaces of the pressure plate and flywheel, and a release mechanism for relieving the clamp load, the pressure plate being formed in two relatively adjustable components which can compensate for variations due to wear in the thickness of the driven plate and thereby maintain a constant clamping condition of the main spring, characterised in that an adjuster mechanism incorporates the relatively adjustable inter-engaging members of the two pressure plate components which maintain a constant inter-engaged state during release and re-engagement of the clutch while the clutch remains in the desired state of adjustment and that a control member responsive to movement between the released and engaged conditions of the clutch is operative to effect an incremental adjustment of the inter-engaging members when said movement exceeds a predetermined distance.

Preferably the resilient means biasses the adjusting mechanism in a direction to effect adjuster and then effects such adjustment when the clamp load has been reduced sufficiently to relieve friction between the two pressure plate components.

It is also preferable that the two inter-engaged pressure plate components are inter-engaged by screw-threaded means.

The invention is particularly applicable to pull-type twin plate clutches which also incorporate a clutch brake.

BRIEF DESCRIPTION OF THE DRAWINGS

In the accompanying drawings.

FIGS. 1 and 2 show a diaphragm spring clutch in accordance with the present invention. The clutch is shown mounted on a flywheel 11 which does not itself form part of the clutch. The flywheel 11 constitutes an input member to the clutch and an output shaft 12, which is in practice a gearbox input shaft and is not part of the clutch, constitutes the output from the clutch. The clutch incorporates a cast cover 13 which is secured to a peripheral flange 14 forming part of the flywheel. An annular pressure plate 15 is constituted by one component 16 incorporating a friction face 17 and a second component 18 having a spring engagement face 19. The two components 16 and 18 of the pressure plate are screw threaded to each other at 21 so that the distance between the friction face 17 and the spring engagement face 19 is adjustable. An adjuster mechanism which is provided will be described subsequently.

Figure 1:
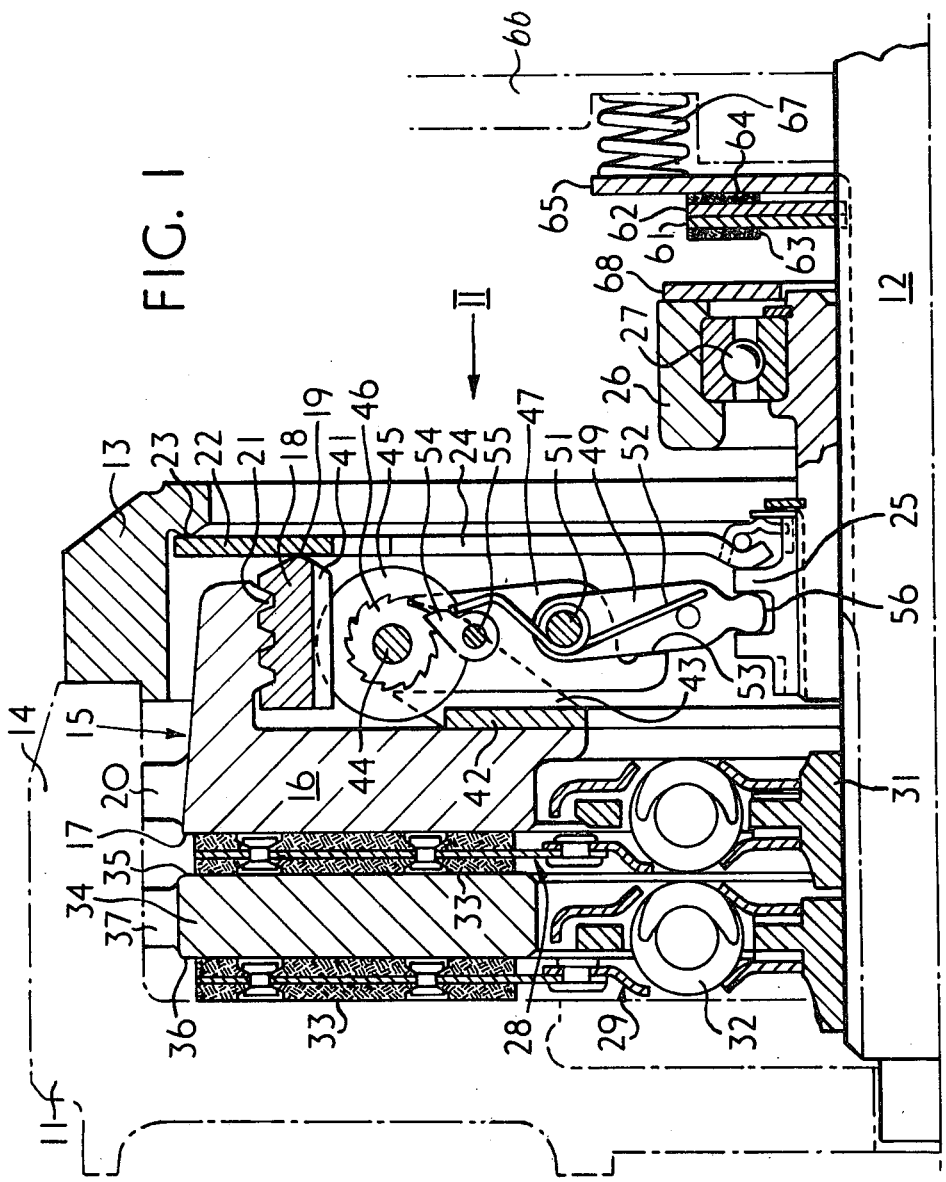
FIG. 1 is a cross-section through half of a clutch according to the invention.

The pressure plate 15 is constrained to rotate with the flywheel 11 and is movable axially in relation to the flywheel 11, the constraint being provided by means such as a series of lugs 20 which may engage in recesses in the flywheel or cover or may be secured to the flywheel or cover by flexible drive straps.

A diaphragm spring 22 acts between a peripheral fulcrum 23 on the cover and the spring engagement face 19 of the pressure plate.

The diaphragm spring 22 normally urges the pressure plate 15 towards the flywheel 11 but a release means constituted by a series of inwardly directed diaphragm spring fingers 24 is provided to enable this load to be relieved. A release sleeve 25 is free to slide axially on the output shaft 12. When the release sleeve 25 is pulled away from the flywheel by means of a release ring 26, through the intermediary of a release bearing 27, the diaphragm spring is deflected and the spring force is released from the pressure plate 15. Thus the clutch release mechanism is constituted by components 24, 25, 26 and 27.

The clutch under consideration is a twin plate clutch in that it incorporates two driven plates 28 and 29. Both driven plates are conventional, each incorporating a hub 31 splined to the output shaft 12, a series of coil springs 32 to transmit torque to the hub 31. from the outer part of the driven plate and friction facings 33 secured to the outer part of the driven plate.

A typical intermediate pressure plate 34 is interposed between the two driven plates 28 and 29 and has friction faces 35 and 36 respectively for engagement with friction facings 33 of the driven plates. The intermediate pressure plate 34 is constrained to rotate with the flywheel 11 but is movable axially in relation to the flywheel, the constraint being provided by means of lugs 37 which may be engaged in grooves in the flywheel or may be attained to the flywheel by means of drive straps.

Thus the cover and both pressure plates 15 and 34 rotate with the flywheel 11 while the driven plates 28 and 29 rotate with the output shaft 12. All of these components are movable axially with respect to each other. In use, the axial load applied by the diaphragm spring 22 to the pressure plate 15 clamps the two driven plates between friction faces on the flywheel and intermediate pressure plate for driven plate 29 and the intermediate pressure plate 34 and main pressure plate 15 for driven plate 28. With no load on the release mechanism, the clutch is in an engaged condition by virtue of frictional engagement of the various friction faces and drive is transmitted from the flywheel 11 to the output shaft 12. In order to release the clutch, the release mechanism is operated as described previously to release the load of the diaphragm spring on the main pressure plate 15. This releases the frictional engagement between the various friction faces so that the flywheel 11 can rotate independently of the output shaft 12. A gradual release of the release load applied to the diaphragm spring enables the drive between the flywheel and output shaft to be taken up gradually.

Figure 2:
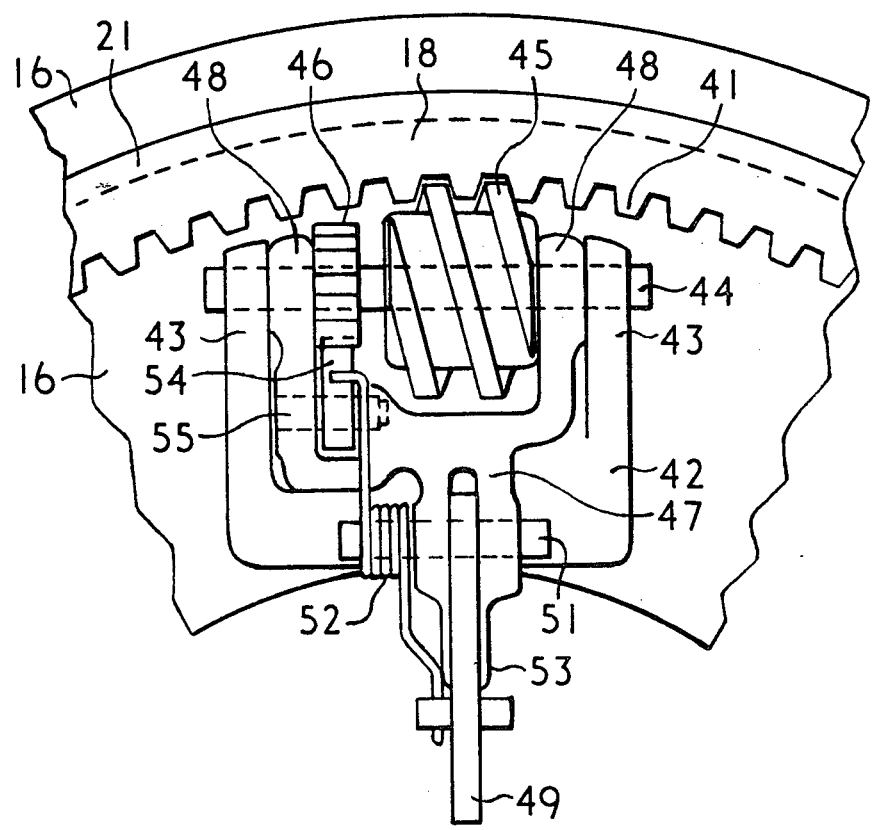
FIG. 2 is a view of an adjuster shown in FIG. 1 in the direction of arrow II of FIG. 1.

As thus far described, apart from the fact that the main pressure plate 15 is in two components 16 and 18, the clutch is conventional. Component 18 of the pressure plate carries a series of internal rack teeth 41 best seen in FIG. 2. These rack teeth 41 co-operate with the adjuster mechanism shown in FIGS. 1 and 2. The adjuster mechanism comprises a bracket 42 which is secured to component 16 of the main pressure plate 15 and incorporates two lugs 43 which between them support a cross shaft 44. A worm gear 45 is supported for a rotation with the shaft 44 and is arranged to mesh with the dog teeth 41 of the component 18 of the main pressure plate. A ratchet wheel 46 is also mounted for rotation with the shaft 44. A primary adjuster lever 47 has two lugs 48 by means of which it is pivotal on the shaft 44. A secondary adjuster lever 49 is pivoted to the lever 47 through a pin 51 and is normally spring loaded by a hair pin spring 52 against a stop 53 on the lever 47. Lever 47 also carries a pawl 54 on a pin 55 and the pawl is held in engagement with the ratchet wheel 46 by means of an arm of the hair pin spring 52. As shown in FIG. 1, the inner end of lever 49 is engaged in a slot 56 in the clutch release sleeve 25 so that lever 49 is moved when the clutch is released.

The clutch shown in the drawing operates in conjunction with a clutch brake intended to reduce the speed of the clutch output shaft (the gearbox input shaft) during a gear change when the clutch is disengaged. The brake incorporates two brake discs 61 and 62 splined to the clutch output shaft 12 and carrying friction facings 63 and 64 respectively. A plate 65 behind the brake discs 61 and 62 is secured to a gearbox casing 66 and is allowed a small axial movement by means of a spring 67. A further plate 68 is carried by the clutch release ring 26. The brake operates when the clutch is fully disengaged so that plate 68 bears against the friction facing 63 of brake disc 61 and causes frictional engagement between the two brake discs 61 and 62 and the two plates 68 and 65 respectively. The spring 67 controls the application of the brake over a small range of clutch release movement but after this movement the clutch brake acts as a positive stop at the end of the movement of the clutch release mechanism. The clutch brake itself is conventional and is not fundamental to the present invention but its functioning as a positive stop to limit clutch release movement is significant to the operation of the clutch adjuster mechanism.

The operation of the clutch adjuster mechanism will now be explained, starting from a condition in which the thickness of the driven plates 28 and 29 has worn away to a limited extent so that a relatively large movement of the pressure plate 15 towards the flywheel is possible. This relatively large movement occurs on clutch engagement so that in turn a relatively large movement of the clutch release mechanism is possible on release of the clutch before the positive stop constituted by the clutch brake is reached. During this release movement, the lever 49 is moved towards the clutch brake about its pivot 51. During initial rearward movement, the force of spring 52 is insufficient to move lever 47 with lever 49 because lever 47 is connected through pawl 54, ratchet wheel 46 and shaft 44 to worm wheel 45 and movement of worm wheel 45 is resisted by friction in the screw thread 21 between the two parts of the main pressure plate as a result of the load of the diaphragm spring. However, as clutch release movement progresses, the load of the diaphragm spring 22 on the pressure plate 15 is released, thereby reducing the resistance to movement of the lever 47 and the associated mechanism. The lever 47 then moves under the influence of spring 52 and through the associated mechanism this causes the worm wheel 45 to rotate the pressure plate component 18 with respect to pressure plate component 16 in a direction to increase the distance between friction face 17 of the component 16 and spring engagement face 19 on component 18. When the clutch is re-engaged lever 47 moves back to the position shown and as a result pawl 54 moves one ratchet tooth around the ratchet wheel 46. In this way, successive cycles of releasing and re-engaging the clutch adjust the two components 16 and 18 of the main pressure plate away from each other to compensate for wear in the driven plate. This adjustment gradually reduces the maximum clutch release travel by adjusting the position of the inner ends of the diaphragm spring fingers 24 and of the release sleeve 25 in the clutch engaged condition in a rearward direction. Adjustment continues until the situation is reached where during clutch release the available movement of levers 49 and 47 is insufficient to move the pawl 54 from one ratchet tooth to the next. At this stage no further clutch adjustment takes place and the clutch remains operative with a limited release travel. In practice, wear of the driven plates take place gradually and each time that this wear is sufficient to allow enough movement of the pawl 54 to engage the next ratchet tooth, a small adjustment takes place. Thus the clutch always remains in substantially the same state of adjustment and is subject to small incremental adjustments in response to wear. This has two significant advantages. Firstly, the range of operation of the diaphragm spring 22 between the fully engaged and fully disengaged positions of the clutch is always constant so that the clutch when engaged always remains constant. In addition, the extent of release movement necessary to engage the clutch brake remains substantially constant so that no separate adjuster is needed for the clutch brake.

If the friction in the mechanism is not sufficient to prevent reverse movement of the mechanism a second pawl may be provided for ratchet wheel 46 to prevent reverse rotation of shaft 44.

Figure 3:
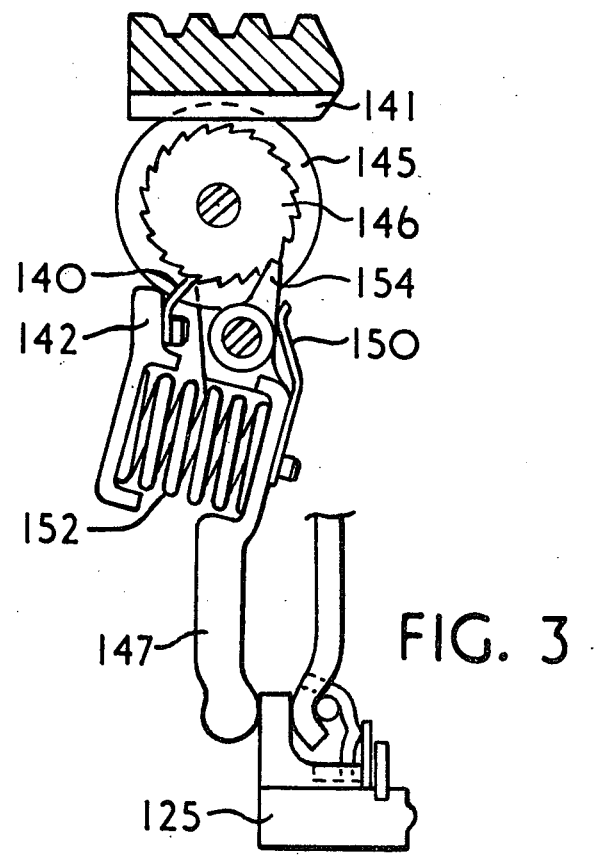
FIG. 3 shows an alternative form of adjuster which could be substituted for the adjuster shown in FIG. 1.

FIG. 3 shows an alternative form of adjuster mechanism which could be used in place of the adjuster mechanism of FIG. 1. In many respects the adjuster mechanism is similar to that shown in FIG. 1 and for that reason the adjuster mechanism of FIG. 3 will be described by a comparison with that of FIG. 1.

In FIG. 3 the primary and secondary levers 47 and 49 are replaced by a single lever 147. This lever carries a pawl 154 which engages a ratchet wheel 146 which is in turn coupled to rotate with a worm wheel 145. Lever 147 is biassed in an anti-clockwise direction as seen in FIG. 3 by means of a compression coil spring 152. A separate leaf spring 150 holds the pawl 154 in engagement with the ratchet wheel 146.

Instead of engaging in a slot 56 in the release sleeve 25, lever 147 bears against an end face of release sleeve 125.

A further leaf spring 140 is secured to the mounting bracket 142 and engages the ratchet wheel 154 to form a second pawl which prevents inadvertent reverse rotation of this ratchet wheel.

Operation of the adjuster mechanism of FIG. 3 is similar to that of FIG. 1. The fundamental difference is that in order to cater for initial clutch release movement without corresponding operation of the adjuster against a higher frictional load, the release lever 147 can be left behind by movement of the release sleeve and then follows the release sleeve by means of a spring load. This contrasts with the arrangement of FIG. 1 whereby lost motion against a spring load was achieved between the primary lever 47 and the secondary lever 49. The arrangement of FIG. 3 thus provides a simplified construction.

I claim:

1. A friction clutch comprising:
   a clutch cover for attachment to a flywheel, said flywheel having a friction surface;
   a pressure plate having a friction surface and comprising two relatively adjustable components;
   a driven plate member arranged between the pressure plate and the flywheel and having friction surfaces for co-operation with said friction surfaces of the flywheel and the pressure plate;
   a main spring assembly operatively engaged between said cover and said pressure plate for providing a clamp load to urge the pressure plate towards the flywheel and thereby grip the driven plate by its friction surfaces between the friction surfaces of the flywheel and pressure plate;
   a release mechanism for relieving the clamp load;
   an adjustable inter-engagement mechanism between the two pressure plate components such that a constant inter-engagement subject to incremental adjustments is achieved between the pressure plate components;
   an adjuster mechanism connected between the two components of the pressure plate and operative to adjust the pressure plate to compensate for variations due to wear of the driven plate to achieve a constant clamping condition of the main spring while the clutch remains in a desired state of adjustment;
   and a control member, responsive to movement between the released and engaged conditions of the clutch and operative to effect an incremental adjustment of the inter-engagement mechanism when said movement exceeds a pre-determined distance.

2. A friction clutch according to claim 1 further comprising a resilient means operative to bias the adjuster mechanism in a direction to effect adjustment and to effect such adjustment when the clamp load has been reduced sufficiently to relieve friction between the two pressure plate components.

3. A friction clutch according to claim 1 said adjustable inter-engagement mechanism being inter-engaged by screw-threaded means.

4. A friction clutch according to claim 1, said adjuster mechanism comprising a pawl and ratchet mechanism.

5. A friction clutch according to claim 4 further comprising a worm drive mechanism operatively interposed between said pawl and ratchet mechanism and said adjustable inter-engagement mechanism.

6. A friction clutch according to claim 1 wherein the release mechanism incorporates a release member which is pulled away from the clutch to release the clutch, the clutch thereby being a pull-type clutch.

7. A clutch according to claim 6 further comprising a clutch brake which also acts as a stop to limit clutch release movement.

8. A friction clutch according to claim 1 further comprising an intermediate pressure plate interposed between said driven plate and said flywheel and a second driven plate interposed between said intermediate pressure plate and said flywheel.

* * * * *